Oct. 20, 1942.     L. A. WARNER     2,299,444
NAVIGATIONAL COMPUTER
Filed Jan. 15, 1941
Fig. 1.
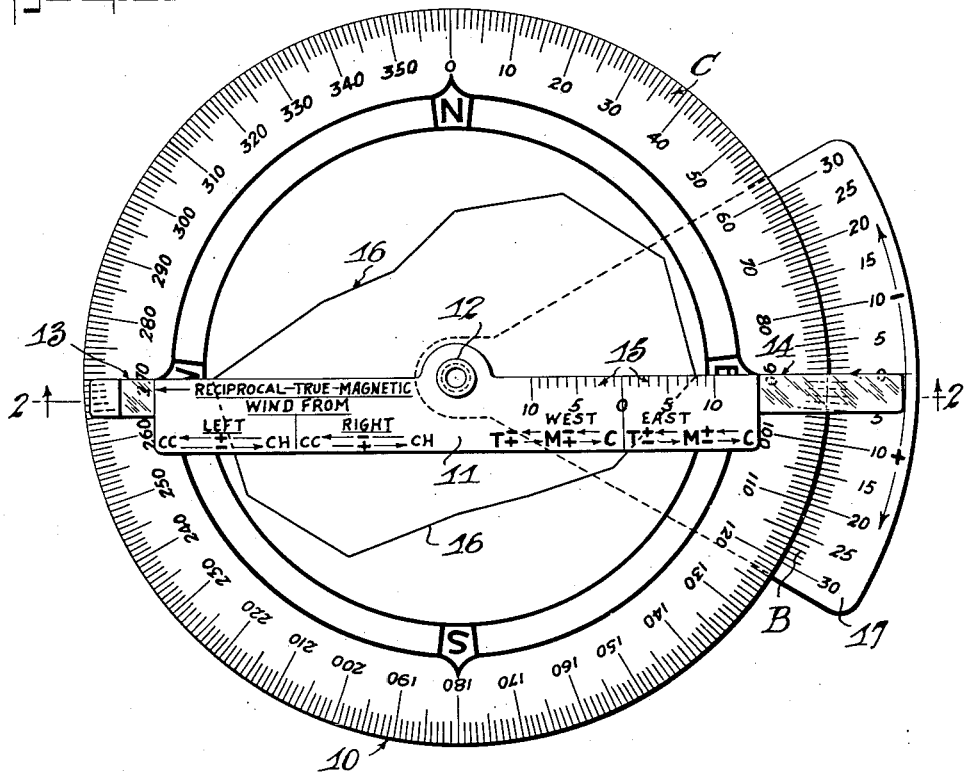
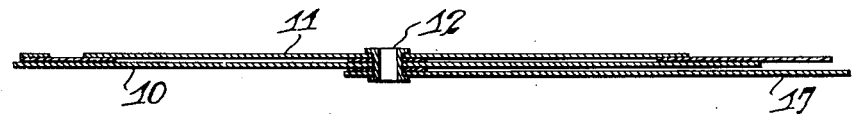
Fig. 2.
Inventor
Louis A. Warner
By
Ben. J. Chromy
Attorney

UNITED STATES PATENT OFFICE 2,299,444

NAVIGATIONAL COMPUTER

Louis Allen Warner, Baltimore, Md.

Application January 15, 1941, Serial No. 374,546

4 Claims. (Cl. 235—83)

This invention relates to a computing device for use in navigation. More particularly this invention relates to a navigational computer from which various navigational corrections, deviations, bearings and the like may be derived directly when it is used in conjunction with a compass.

An object of this invention is to provide a device for converting the true course of a craft to a compass course.

Another object of this invention is to provide a device for converting the compass course to a compass heading.

Still another object of this invention is to provide a device for converting compass bearings to magnetic bearings or true bearings.

A further object of this invention is to provide a device for converting compass courses to magnetic or true courses.

Still another object of this invention is to provide a device for deriving reciprocal bearings or courses.

A further object of this invention is to provide a device in which the computations and conversions set forth in the preceding objects may be done on the device directly without the necessity of using supplementary devices or calculations.

Other objects of this invention will be apparent to those skilled in the art to which it relates from the following specification, the drawing and the claims.

In accordance with this invention I provide a convenient computing device which may be readily carried in the vest pocket and employed while piloting or operating a craft such as an aircraft and on which various factors, figures, corrections, deviations and the like, necessary or convenient to the aircraft pilot may be derived from the initial compass or other instrument readings. My device is a complete computer and does not require that the operator engage in supplementary mental or pencil and paper computations. Consequently this device lends itself to convenient use for pilots or operators while on duty.

In general this device consists of a substantially circular scale calibrated from zero to 360 degrees and resembling a compass rose. A curve corresponding to the compass deviations for the particular craft in which the particular compass is installed is plotted on this scale or chart for the different directions of the compass. An arcuate scale bearing member is pivoted in the center of the aforesaid circular scale and is provided with two sets of calibrations, for example from zero to 30 each, adjacent to the circumference of the first scale. The individual calibrations or markings of these two scales are equal and the reason for this will be apparent from further paragraphs of this specification. A rotatable arm also pivoted in the center of the first scale is used in conjunction with these two scales and in conjunction with the compass deviation curve.

An embodiment of this invention will be more fully described in following paragraphs of this specification in conjunction with the drawing, in which, briefly, Fig. 1 is a top plane view of this invention and Fig. 2 is a sectional view taken along the line 2—2 of Fig. 1.

Referring to the drawing in detail, reference numeral 10 designates a circular card-like member which may be made of cardboard, selenoid, "Bakelite" or similar resin products, or a combination of the aforesaid such as cardboard impregnated with "Bakelite" or similar resins. The circumference of this card 10 is calibrated in degrees from zero to 360. The zero and 360 calibration corresponds to north or N of the compass rose, 90 corresponds to east or E, 180 corresponds to S and likewise 270 corresponds to W. This scale will be referred to hereinafter as scale C. The arm 11 is pivoted in the center of the card 10 by means of a rivet 12 so that the edges 13 and 14 of this arm may be moved across the various diameters of the card 10 and readings taken from the scale C. Scale 15, calibrated from zero to 10 east and zero to 10 west is provided on the arm 11 for the purpose of taking readings off of the compass deviation curve 16. The arcuate scale member 17 is also pivoted to the center of the card 10 by the rivet 12 so that the scale B carried by this member 17 may be rotated with respect to this scale C.

The curve 16 is obtained after the compass is installed in the craft to provide a measure of the deviation introduced in the compass readings and this varies for different directions of the compass instrument. As the arm 11 is rotated the compass correction or deviation may be read from the scale 15 and the curve 16. This reading is then employed in the following examples. The device of my invention may be employed in numerous ways and a number of these are set forth in the following paragraphs.

*Converting true course to compass course*

Set arrow on scale B opposite the true course reading on scale C. Set arm 11 so that its edge 14 underlines both the true course reading and 0 on scale B. Derive the magnetic variation angle and direction from the navigational chart for the particular locality. Move arm 11 with reference to scale B, the number of divisions equal to the number of degrees of variation derived from the chart, up if easterly, and down if westerly, moving arm 11 up subtracts from while moving it down adds to reading of scale C and the true course, corrected for variation, or the magnetic course, may now be read on scale C, as underlined by the edge 14 of arm 11.

*Derive the deviation angle and direction directly from the computer*

The deviation error for the magnetic course underlined by arm 11, may be read directly at the scale 15 carried by arm 11, wherever the curve pattern 16 crosses the scale. The method for correcting deviation is the same as that for correcting variation. Set arrow on scale B opposite the magnetic course reading on card C. Set arm 11 so that its edge 14 underlines both the magnetic course reading and 0 on scale B. Move arm 11 with reference to scale B, the number of divisions equal to the number of degrees of deviation, up if easterly, and down if westerly. The magnetic course corrected for deviation, or the compass course, may now be read on card C, as underlined by arm 11. For example, if the true course were 52 degrees and the variation 10 degrees west. Set arrow on scale B opposite 52 degrees on card C. Set arm 11 so that it underlines 52 on card C and 0 on scale B. Move arm 11 ten degrees down over scale B, then read the magnetic course on card C. The curve 16 crosses the scale 15 on arm 11 and shows an 8 degree easterly deviation. Set arrow on scale B opposite the 62 on card C. Move arm 11 eight degrees up over scale B, and read the compass course of 54 degrees on card C.

*Converting compass course to compass heading*

Set arrow on scale B opposite the compass course reading on card C. Set arm 11 so that it underlines both the compass course reading and 0 on scale B. Derive the wind correction angle by solving the triangle of velocities. Move arm 11 with reference to scale B the number of degrees, equal to the value of the wind correction angle, up if the wind is from the left, and down if the wind is from the right. The compass course, corrected for wind, or the compass heading, may now be read on card C, as underlined by arm 11. For example, if the compass course, as found above, is 54 degrees, and the wind correction angle is 7 degrees left. Set arrow on scale B opposite 54 degrees on card C. Move arm 11, so that it underlines 54 on card C and 0 on scale B. Then move arm 11, seven divisions up over scale B, and read the compass heading on card C.

*Reciprocal bearings or courses*

Reciprocals or back bearings for readings underlined by the edge 14 of arm 11 may be read directly from scale C at the edge 13 of arm 11.

*Converting compass bearings to magnetic bearings or true bearings*

Set arrow on scale B opposite the indicated compass bearing on card C. Set arm 11 so that it underlines both the compass bearing on card C and 0 on scale B. Derive the deviation directly from the computer, curve 16 and scale 15. Move arm 11 with reference to scale B, the number of divisions equal to the number of degrees of deviation, down if easterly and up if westerly. The compass bearing, corrected for deviation, or the magnetic bearing, may now be read on card C, as underlined by edge 14 of arm 11. To convert magnetic bearings to true bearings, the correction for variation, is then applied in the same manner as that for deviation. For example, if the compass bearing were 100 degrees, and the variation 8 degrees west. Set arrow on scale B opposite 100 on card C. Set arm 11, so that it underlines both 100 on card C and 0 on scale B. The curve 16 crosses the 5 east mark on the scale 15 on arm 11 therefore the deviation is 5 east. The symbols show that for conversion from compass to magnetic, easterly deviation is added, therefore arm 11, is moved 5 divisions downwards over scale B. Arm 11, then underlines a reading of 105 degrees on card C, which is the compass bearing corrected for deviation, or the magnetic bearing. If it is desired to convert the magnetic bearing to a true bearing, the correction for variation is then applied, as follows: Set arrow on scale B opposite 105 on card C. Arm 11 will then underline both the 105 on card C and the 0 on scale B. In converting from magnetic to true, westerly variation is subtracted, therefore, arm 11 is moved upwards eight divisions. Arm 11 will then underline the 97 degree mark on card C, which is the magnetic bearing corrected for variation or the true bearing.

In converted compass courses to magnetic or true courses the procedure is the same as that for converting bearings.

Instructions for the use of this computer are given in abbreviated form on the arm 11 and in these CC means "compass course," CH means "compass heading," T means "true bearings," M means "magnetic bearings" and C means "compass bearings."

The term "deviation" is intended to mean the angle that a compass needle is deflected from the magnetic meridian by local magnetism, such as, for example the magnetism of parts in the aircraft or other craft carrying the compass. The term "variation" is distinct from deviation and refers to the angle between the true meridian and the magnetic meridian. This may vary considerably from one locality to another and is obtained from charts and records of magnetic surveys.

Having described my invention what I claim is as follows:

1. A navigational computer for use with compasses, comprising: a substantially circular card having a scale around the circumference thereof and an open central area for receiving the magnetic deviation curve for a compass, an arm pivoted at the center of said substantially circular card, said arm having a scale for reading magnetic deviation from said curve corresponding to different deflections of the compass, an auxiliary scale member of substantially arcuate shape pivoted at the center of said substantially circular card, said auxiliary scale having positive and negative graduations substantially equal to the graduations of said substantially circular scale so that readings taken from said magnetic deviation curve and magnetic variation values may be added to or subtracted from readings of said substantially circular scale by positioning the zero pointer of said auxiliary scale on the reading of said substantially circular card and moving said arm either clockwise or counterclockwise by the amount of the magnetic deviation read from said auxiliary scale corresponding to the position of said arm and by the amount of the magnetic variation, to obtain the correct reading from said substantially circular scale.

2. A navigational computer for use with compasses, comprising: a substantially circular card having a scale around the circumference thereof and an open central area for receiving the magnetic deviation curve for a compass, an arm pivoted at the center of said substantially circular card for moving an edge of said arm along the scale of said card to a reading on said scale corelated to the direction of navigation, said arm having a scale for reading magnetic deviation from said curve of the compass corresponding to the aforesaid scale reading, an auxiliary scale member of substantially arcuate shape pivoted at the center of said substantially circular card, said auxiliary scale having positive and negative graduations substantially equal to the graduations of said substantially circular scale so that readings taken from said magnetic deviation curve may be added to or subtracted from the aforesaid scale reading of said substantially circular scale by positioning the zero pointer of said auxiliary scale on the reading of said substantially circular scale and moving said arm either clockwise or counterclockwise by the amount of the magnetic deviation as read from said auxiliary scale, to obtain the desired reading from said substantially circular scale.

3. A navigational computer for use with compasses, comprising: a substantially circular card having a scale around the circumference thereof and an open central area for receiving the magnetic deviation curve for a compass, an arm pivoted at the center of said substantially circular card, said arm having a scale for reading magnetic deviation from said curve corresponding to different deflections of the compass, said arm scale being graduated in degrees east deviation and degrees west deviation on opposite sides of a zero pointer, an auxiliary scale member of substantially arcuate shape pivoted at the center of said substantially circular card, said auxiliary scale having positive and negative graduations substantially equal to the graduations of said substantially circular scale and covering a range at least equal to that of said arm scale so that readings taken from said magnetic deviation curve and magnetic variation values may be added to or subtracted from readings of said substantially circular scale by positioning the zero pointer of said auxiliary scale on the reading of substantially circular scale and moving said arm either clockwise or counterclockwise by the amount of the magnetic deviation as read from said auxiliary scale, to obtain the desired reading from said substantially circular scale.

4. A navigational computer for use with compasses, comprising: a substantially circular card having a scale around the circumference thereof and an open central area for receiving the magnetic deviation curve for a compass, an auxiliary scale member of substantially arcuate shape pivoted at the center of said substantially circular card, said auxiliary scale having positive and negative graduations substantially the same as the graduations of said substantially circular scale, an arm pivoted at the center of said substantially circular card, said arm having a scale for reading magnetic deviation from said curve corresponding to different deflections of the compass, said arm having a straight edge portion adapted to coincide with at least a portion of a selected diameter of said substantially circular card, so that it will underline desired readings of both said circular scale and said auxiliary scale, so that readings taken from said magnetic deviation curve and magnetic variation values may be added to or subtracted from readings of said substantially circular scale by positioning the zero pointer of said auxiliary scale on the reading of said substantially circular scale and moving said arm either clockwise or counterclockwise by the amount of the magnetic deviation as read from said auxiliary scale, to obtain the desired reading from said substantially circular scale.

LOUIS ALLEN WARNER.